United States Patent [19]
Pomella et al.

[11] 3,987,350

[45] Oct. 19, 1976

[54] NUMERICAL CONTROL SYSTEM FOR CENTER LATHES

[75] Inventors: Piero Pomella; Luciano Lauro, both of Ivrea (Turin), Italy

[73] Assignee: Ing. C. Olivetti & C., S.p.A., Ivrea (Turin), Italy

[22] Filed: June 6, 1974

[21] Appl. No.: 477,137

Related U.S. Application Data

[63] Continuation of Ser. No. 254,275, May 17, 1972, abandoned.

[52] U.S. Cl. .............................. 318/571; 318/572
[51] Int. Cl.² ........................................ G05B 19/24
[58] Field of Search ........................... 318/571, 572

[56] References Cited
UNITED STATES PATENTS

| | | | |
|---|---|---|---|
| 3,211,896 | 10/1965 | Evans et al. | 318/571 X |
| 3,308,279 | 3/1967 | Kelling | 318/571 X |
| 3,492,467 | 1/1970 | Caban et al. | 318/572 X |
| 3,500,150 | 3/1970 | Foster | 318/571 X |
| 3,594,563 | 7/1971 | Bishop | 318/572 X |
| 3,605,531 | 9/1971 | Izumi et al. | 318/572 X |
| 3,685,022 | 8/1972 | Raynes | 318/572 X |
| 3,698,268 | 10/1972 | Cutler | 318/571 X |
| 3,705,339 | 12/1972 | Rhoades et al. | 318/571 |
| 3,720,120 | 3/1973 | Cutler | 318/571 X |
| 3,725,651 | 4/1973 | Cutler | 318/571 X |

*Primary Examiner*—Robert K. Schaefer
*Assistant Examiner*—John W. Redman
*Attorney, Agent, or Firm*—I. J. Schaefer

[57] ABSTRACT

Numerical control apparatus for a lathe which reads from an input medium data specifying the transverse and axial position of the cutting edge of a lathe tool with respect to the axis of the workpiece being machined, the cutting rate for the tool, and the rate of advance of the tool. The apparatus includes processing means responsive to the data for generating a continuous transverse position datum for the tool and computing means controlled by the cutting rate datum and the continuous transverse position datum for controlling the rotational speed of the mandrel of the lathe.

5 Claims, 3 Drawing Figures

NUMERICAL CONTROL SYSTEM FOR CENTER LATHES

This is a continuation of application Ser. No. 254,275, filed May 17, 1972, now abandoned.

CROSS REFERENCE TO RELATED APPLICATION

The convention priority application for this invention is Italian application No. 68650-A-71 filed on May 18, 1971, in Italy.

BACKGROUND OF THE INVENTION

The present invention relates to a numerical control system which controls the speed of rotation of the mandrel of a center lathe.

Numerical control systems are known which position a movable part of a machine tool on the basis of an instruction program containing the indication of discrete points of the path of the movable part, these being connected by rectilinear segments or by circular arcs. Interpolating means forming part of the numerical control system enable the numerical control of continuous type of the movable part to be effected on the basis of the coordinates of the discrete points.

In the application of these known systems to the numerical control of a lathe, it is therefore possible to execute turning operations by prescribing longitudinal dimensions and diameters of points of discontinuity in the desired profile of the workpiece, which are connected by rectilinear portions or circular arcs, and by moreover prescribing the speed of displacement of the tool along the path and the speed of rotation of the lathe mandrel.

However, while the speed of displacement of the tool along the desired path is influenced by considerations of a technological nature and with the required degree of finish, and therefore depends directly on decisions which are the concern of the programmer, the speed of rotation of the mandrel, on the other hand, is influenced by the cutting speed it is desired to employ and which also depends on the diameter of the workpiece at each point. In order to determine the program of the value of the speed of rotation of the mandrel which is to be prescribed, the programmer must therefore first decide the cutting rate desired in relation to the tool used, the material being machined and the depth of cut, and calculate from this the speed of rotation of the mandrel by dividing the cutting rate by the circumference of the work at that point.

This calculation is relatively simple and quick to carry out in the case where the workpiece is constituted by a succession of cylindrical zones such as to require the computation of a small number of speeds of rotation of the mandrel. The problem is complicated, however, when the workpiece comprises zones with a continuous variation in the diameter, for example conical or frustoconical zones or zones obtained by revolution from curves constituted, for instance, by a succession of circular arcs. In such zones, there must be prescribed a speed of rotation of the mandrel which is calculated as a ratio between the maximum acceptable cutting rate and the circumference at the point of the zone having the maximum diameter, with considerable extension of the machining times. If it is desired to maintain an optimum machining rate to reduce the machining times as much as possible, it is necessary to draw up a program specifying point by point the speed of rotation of the mandrel along the zone with a continuous variation in diameter, with consequence increase in the length and preparation time of the program, increase of the probability of errors and, in the end, relinquishing of the advantages offered by numerical control systems.

It would therefore be desirable to achieve the numerical control in such manner that the program governing the same contains, rather than an indication of the speed of rotation of the mandrel, an indication of the desired cutting rate.

Moreover, in the application of such numerical control systems of prior art to turning machining operations, the datum specifying the diameter is translated by the numerical control system into a position of the tool slide with respect to a selected reference plane such that the distance of the cutting edge of the tool used from the axis of rotation of the workpiece is equal to the desired radius, whereby the information relating to the actual diameter is lost. When the tool is replaced by another tool during the machining process, the position of the tool slide no longer corresponds to the required position of the cutting edge. Moreover, it may happen that the new tool has its cutting edge displaced longitudinally from the position of the cutting edge in the preceding tool. Both these factors give rise to errors both of longitudinal dimension and of diameter.

Although it is possible to take account of the different lengths and different longitudinal positions of the cutting edges of different tools by introducing artificial diameter and dimension data in which there are included the differences in length and dimension, it would be desirable to be able to formulate the programs with instructions containing the real data of the problem, with the addition of instructions specifying divergences of length or dimension in changing from one tool to another.

SUMMARY OF THE INVENTION

The aforesaid problems are solved by the invention, which provides numerical control system for lathes, comprising a program part which produces a discrete datum for the transverse positioning of a lathe tool along a coordinate representing the distance of the cutting edge of the tool from the axis of a workpiece to be machined and carried by a mandrel of the lathe, and processing means controlled by the program part and responsive to the discrete datum for generating a continuous transverse positioning datum for the tool, the program part moreover being adapted to produce a cutting rate datum, and the system further comprising computing means fed with the said last two data for forming the ratio between the cutting rate datum and the continuous transverse positioning datum of the tool and supplying an output datum proportional to the said ratio to be applied as command instruction to a servomotor of the mandrel for regulating the speed of rotation thereof in proportion to the said ratio.

BRIEF DESCRIPTION THE DRAWINGS

A preferred embodiment of the invention will now be described, by way of example, with reference to the accompanying drawings, in which.

DETAILED DESCRIPTION

Figure 1:
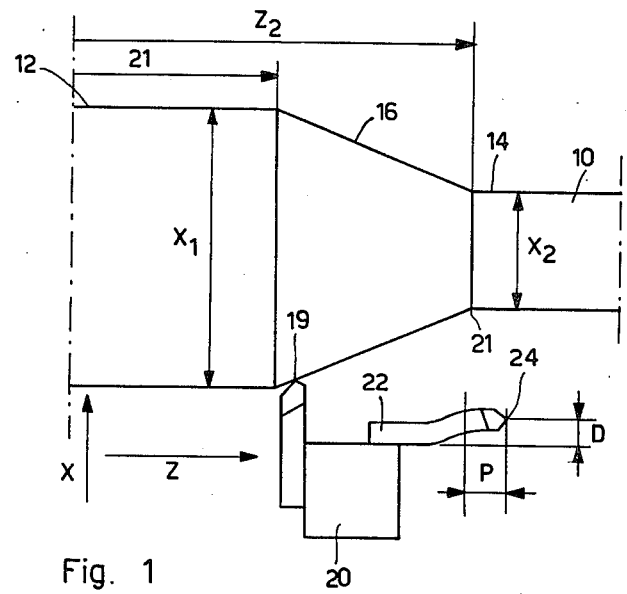
FIG. 1 is a partial diagrammatic representation of a lathe tool turret in relation to the workpiece being machined.

FIG. 1 shows in a diagrammatic form the arrangement of a workpiece to be machined in relation to the machining tool on a lathe. The workpiece 10 to be machined comprises two cylindrical zones 12, 14 with diameters $x_1$, $x_2$, respectively. Between the dimensionsn $z_1$, $z_2$ which define the adjacent ends of the cylindrical zones 12, 14 there is a non-cylindrical zone 16, which is frustoconical in this case.

The work 10 is machined by a tool 18 carried on a turret 20 able to execute movements in a direction parallel to the axis of rotation of the work 10 (arrow Z) and in a direction perpendicular to this axis of rotation (arrow X), due to the action of interdependent tool slides (not shown) which support the turret. The turret 20 is moreover provided with a second tool 22. Known servomechanisms (not shown), controlled by continuous positioning orders supplied by a numerical control system (not shown) described hereinafter, move the turret 20 through the medium of the slides supporting it to cause the cutting edge 19 of the tool 18 to travel along a desired path, at a desired speed, in the plane XZ.

The numerical control system moreover supplies orders from a driving device adapted to rotate the turret 20 by angular increments of 90° to bring the second tool 22 into operative position in accordance with requirements. When the tool 22 is in operative position, its cutting edge 24 is displaced from the position of the cutting edge 19 of the tool 18 by divergences P, D, respectively, in the directions X, Z.

Figure 2:
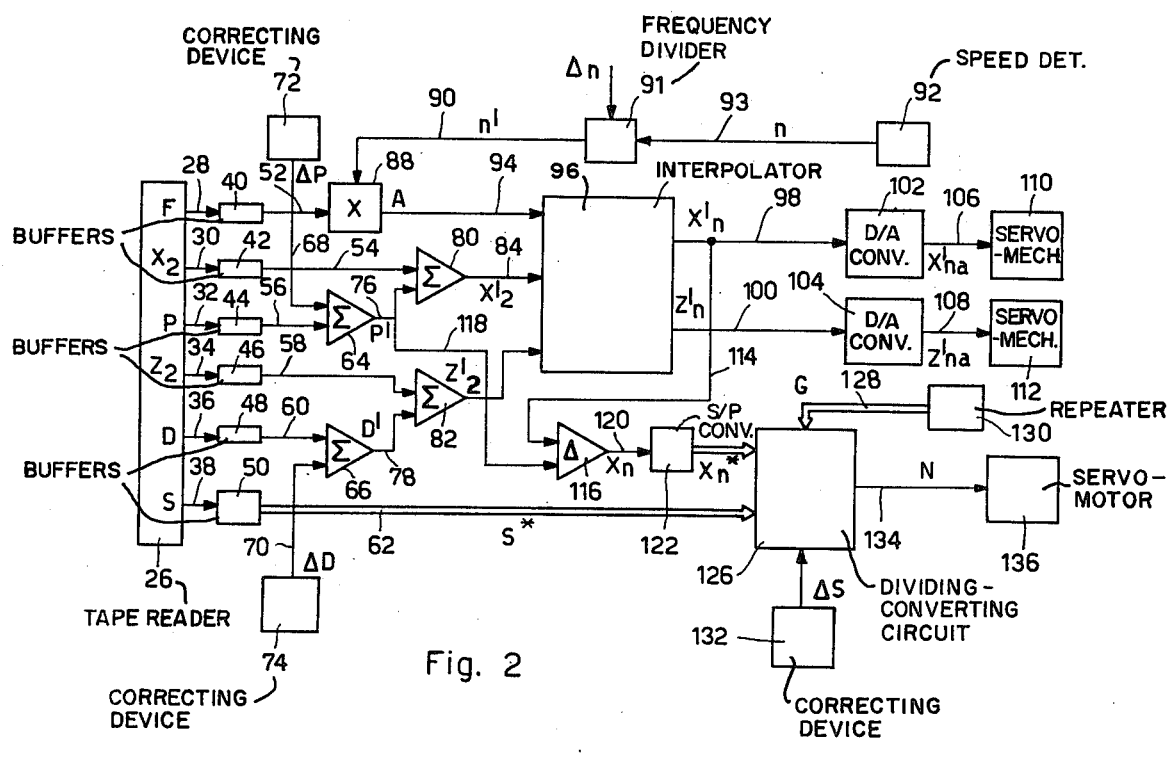
FIG. 2 is a block diagram of a numerical control system for lathes embodying the invention.

FIG. 2 is a block diagram of an improved numerical control system embodying the invention. A punched tape reader 26 reads data representing discrete points of the path of the tool from a program recorded on tape (not shown.) In the case of FIG. 1, the last data read by the reader may be assumed to correspond to the point 21, which is represented by an indication $x_2$ in mm of the diameter of the part and indication $z_2$ in mm of the longitudinal dimension thereof. Further data, P. D, in mm read by the reader 26 represent divergences, in the direction of the diameter and in the longitudinal direction of the workpiece, respectively, of the operative position of the cutting edge 24 of a tool 22 with respect to the corresponding operative position of the cutting edge 19 of the tool 18, regarded as a reference tool, although the latter does not necessarily correspond to a real tool.

Another datum F read by the reader 26 prescribes the feed rate of the tool in the direction Z in the form of movement increments per rotation of the workpiece of revolution of the mandrel (mm/revolution).

Finally, the reader 26 reads from the program a datum S representing the cutting rate required in the machining, in the form of distances covered by the cutting edge along the surface of the workpiece in a unit of time (mm/min.).

Other data read by the reader 26 prescribe respectively which of the tools 18, 22 (and of possible other tools carried by the turret 20) is employed in the machining process, and what transmission ratio or mechanical range ratio is to be set in a speed change gear which transmits the movement from the mandrel motor to the mandrel. These instruction data command suitable servomechanisms directly through buffer stores. However, since these signals and the devices on which they act are known and do not form part of the invention, they are not shown in the drawings and will not be further discussed.

All the data are read by the reader 26 in serial form and in this form the data or instructions F, $x_2$, P, $z_2$, D, S are respectively applied through single wire lines 28, 30, 32, 34, 36, 38 to respective buffer stores 40, 42, 44, 46, 48, 50. The stores 40, 42, 44, 46, 48 may suitably be magnetostrictive delay lines timed by a clock (not shown) to restore the input signals periodically, still in serial form, on lines 52, 54, 56, 58, 60. The store 50, on the other hand, is preferably a flip-flop type register which translates the serial data arriving along the line 38 into parallel data supplied on a twelve-wire output line 62 (for three digits in BCD code).

The data P, D available on the lines 56 and 60, respectively, are each sent to a first input of respective serial digital adders 64 and 66. Through respective lines 68, 70 there arrive at the two respective second inputs of the adders 64 and 66 respective data Δ P, Δ D supplied by manual correcting devices 72, 74 of known type, which enable small corrections to be made manually in the data P, D. Therefore, the corrected divergences P', D' of the cutting edge of the tool used with respect to a real or imaginary reference tool are available on the output lines 76 and 78, respectively, of the adders 64 and 66.

Further serial digital adders 80, 82 receive through the lines 54, 76 and 58, 78, respectively, the two pairs of data $x_2$, P' and $z_2$, D' and supply as output, on the lines 84 and 86, the artificial data $x'_2$, $z'_2$, respectively, of diameter and longitudinal dimension of the part, which takes account of the divergences of position of the tool used.

The instruction F for the rate of feed in mm/revolution which is available on the line 52 is applied to a first input of a multiplying device 88. A second input of this multiplying device receives a signal $n'$ through a line 90 from an adjustable frequency divider 91 driven through a line 93 by a signal n generated by a angular speed detector 92 associated with the mandrel of the lathe. The signals $n$, $n'$ are constituted by trains of pulses with a frequency proportional to the speed of rotation of the mandrel. The ratio $n'/n$ between the output and input signals of the adjustable frequency divider 91 can be adjusted manually from the control console of the numerical control system by limited percentage variations for the purpose of final calibration or correction of the feed data entered in the program. The multiplying device 88 multiplies the signal F by the signal $n'$, thus obtaining a datum A, emitted on a line 94, representing the feed rate prescribed for the tool in the form of distance covered in a unit of time (mm/min.).

Although the multiplying device 88 may comprise an encoder of the resettable counter type, for converting the signal of frequency $n'$ to a digital signal and a digital multiplying device of conventional type, it is preferred, for the purpose of simplifying the circuits, to form the multiplying device 88 as an accumulator controlled by pulses under the control of the clock (not shown), which adds the digital datum F to itself at each pulse arriving from the line 90 in the unit of time set by the clock (not shown), to supply in this way a digital datum A representing the product $nF$.

The digital instructions A, $x'_2$, $z'_2$ respectively available on the lines 94, 84, 86 pass into an interpolator 96 of known type, for example of the type described in U.S. Pat. No. 3,518,513, which interpolates the discrete input instructions to supply substantially continuous output data $x'_n$, $z'_n$ or recurring discrete data having a period which is negligible with respect to the mechanical time constants of the machine, on lines 98 and 100, respectively. The data $x'_n$, $z'_n$ therefore represent, point by point, the transverse position and the longitudinal dimension of the tool and, therefore, of the cross and longitudinal slides.

The serial digital data $x'_n$, $z'_n$ are then converted into analogue form by respective digital-to-analogue converters 102, 104 of known type, which apply the individual respective analogue output instruction signals $x'_{nA}$, $z'_{nA}$ through lines 106, 108 to respective servomechanisms 110, 112 for positioning the cross slide and the longitudinal slide (not shown) on which the turret 20 with the tools 18, 22 is carried.

Command of the cutting rate cannot take place with the direct use of the cutting rate instruction S for command of the servomechanism associated with the mandrel, inasmuch as, while S is given in m/min, the speed of rotation is expressed in r.p.m. In order that the mandrel may rotate at a speed such as to give rise to the prescribed cutting rate S, the following equation must be satisfied:

$$S = \pi x_n \omega,$$

in which:
S is the prescribed cutting rate in m/min already mentioned;
$X_n$ is the "instantaneous" diameter of the workpiece in mm,
$\omega$ is the speed of rotation of the mandrel in r.p.m.

However, since the mandrel is actuated through a speed change gear, which is actuated in turn by the mandrel servomotor, and since the regulation command is sent to this servomotor, it is necessary to multiply $\omega$ by the transmission ratio or mechanical range ratio G of the speed change gear or transmission device to obtain a datum N prescribing the speed of rotation of the servomotor:

$$N = G\omega,$$

whence $$N = (GS/\pi x_n)$$

It is necessary to note that $x_n$ is the real diameter of the workpiece at a given point, that is the artificial continuous transverse positioning datum devoid of possible corrections P' corresponding to the divergences of position of the cutting edge of the tool used, at that point, with respect to a reference tool.

Therefore, the artificial continuous serial digital instruction $x'_n$ present on the line 98 is applied through a line 114 to a first input of a digital subtracting circuit 116, the other input of which is supplied with the corrected transverse divergence datum P' through a line 118. The output signal $x_n$ of the subtracting circuit 116 on the line 120 therefore represents the real diameter of the workpiece expressed in serial digital form. This datum is applied to a serial-to-parallel converter 122 constituted, for example, by a flip-flop type register to obtain on an output line 124 a datum $x_n^*$ representing the actual diameter of the workpiece in parallel digital form.

A dividing-converting circuit 126 which forms the ratio between two input signals in parallel digital form and converts the quotient into analogue form, receives at a first input, through a line 62, the parallel digital cutting rate datum S* and, at a second input, the parallel digital datum $x_n^*$ representing the actual diameter of the workpiece, through a line 124. The output signal N, in analogue form, therefore satisfies the equation $$N = k\ S^*/x_n^*$$

in which $k$ depends on the parameters of the circuit.

A third input of the dividing-converting circuit 126 receives through a line 128, from known repeating means 130 associated with the speed change gear of the mandrel, a parallel digital signal G representing the transmission ratio or mechanical range ratio at which the machine is set at that instant. As will be better described hereinafter, this signal G is adapted to act proportionally on the coefficient of proportionality $k$ of the dividing-converting circuit 126 in such manner that it supplies in practice a signal N in accordance with the equation $$N = k'\ GS/x_n$$

Another correcting device 132, which is actuated manually, enables further small corrections of the coefficient of proportionality of the foregoing equation to be made manually for the purpose of allowing improvements and optimization operations, at the location of execution, of the cutting rate at which the machining is executed. The correcting device 132 is therefore calibrated in percentage corrections of cutting rate $\Delta S$.

The analogue output signal N of the dividing-converting circuit 126 is finally applied on a line 134 to the servomotor 136 actuating the mandrel of the lathe.

The dividing-converting circuit 126 can be of known type and comprise, for example, digital-to-analogue converters for each of the input signals and known ratio-forming circuits for analogue signals comprising a controllable-gain amplifier stage for varying the coefficient of proportionality $k$ or $k'$. According to a preferred embodiment of the invention, however, a particularly advantageous circuit shown diagrammatically in FIG. 3 is used.

Figure 3:
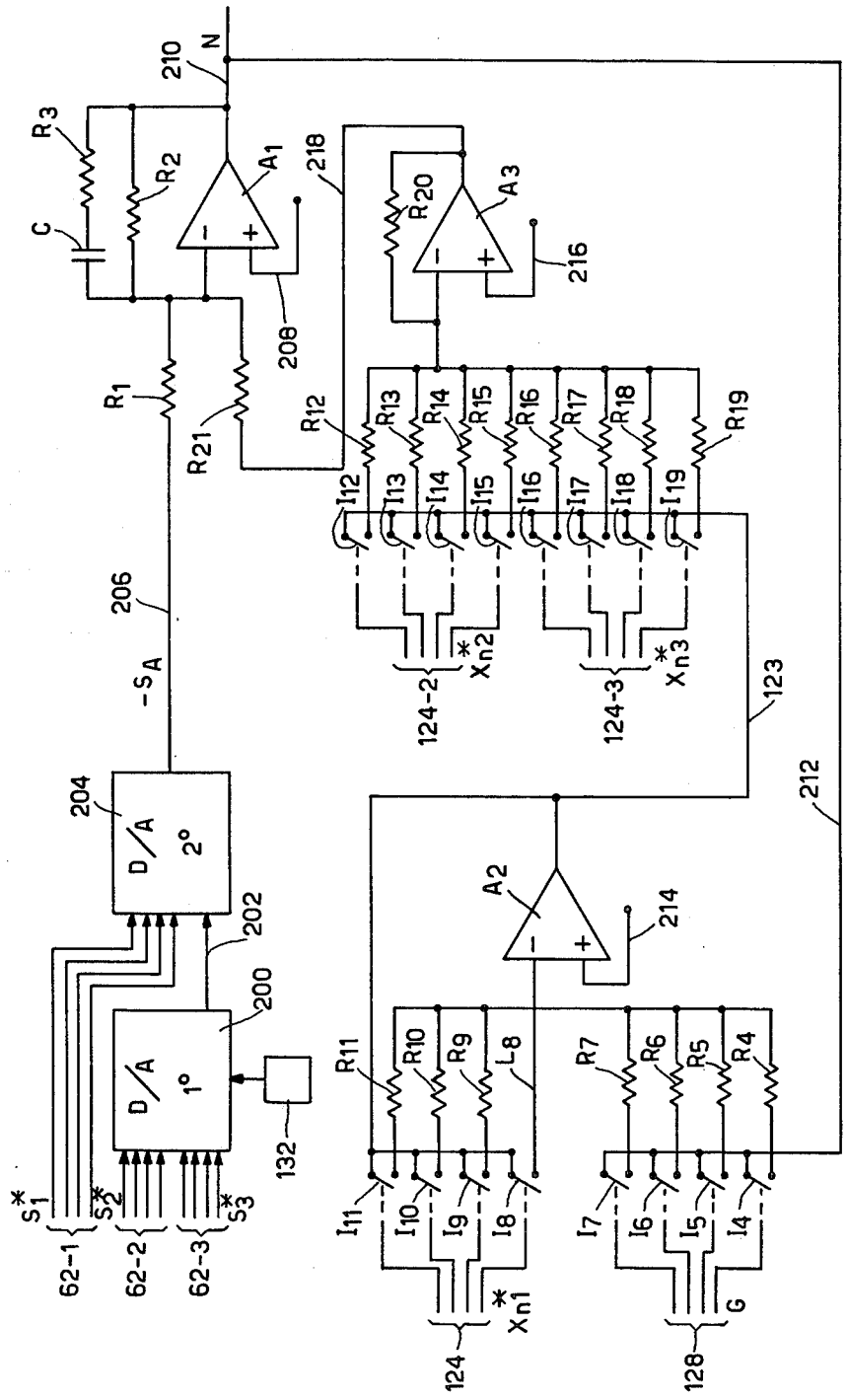
FIG. 3 is a diagram, partly in block form, of the dividing circuit of the system of FIG. 2.

The cutting rate instruction S* reaches the dividing-converting circuit 126 through the twelve-wire line 62 in BCD form, with three digits $S_1^*$, $S_2^*$, $S_3^*$, through three groups of four wires of the twelve-wire line 62 which are indicated in FIG. 3 by the references 62-1, 62-2, 62-3, respectively.

The second and third digits $S^*_2\ S^*_3$ of the cutting rate instruction represent two significant digits, or the mantissa, of the cutting rate, while the third digit $S^*_1$ indicates the scale or order of magnitude of the rate, that is indicates in a conventional manner the power of 10 by which to multiply the number $S^*_2\ S^*_3$ to obtain the required cutting rate. The digital number $S^*_2\ S^*_3$ is converted into analogue form in a first digital-to-analogue converter stage 200, the conversion constant of which can be varied by means of the manual correcting device 132, which is suitably of the potentiometer type. This correcting device 132 enables the person supervising the machine to reduce the programmed cutting rate if, on the basis of his own experience, the nature of the shavings or other factors on which an opinion may be based indicate that the programmed rate is excessive for good machining. Conversely, if the person supervising the machine judges a higher rate to be admissible without prejudice to the machining, he will be able to introduce this increase into the machining, thus achieving the saving of time.

The analogue output datum of the first stage is applied through a line 202 to a second digital-to-analogue conversion stage 204 controlled by the digit $S^*_1$ through the group of wires 62-1 to bring the signal present on the line 202 to the prescribed order to magnitude and supply on the output line 206 an analogue cutting-rate instruction signal $-S_A$ of negative sign.

From the line 206 the signal $-S_A$ is applied through an input resistor $R_1$ to the negative input of an operational amplifier $A_1$, to the positive input of which a potential for compensation of the offset is applied through a line 208. Between the output 210 of the amplifier $A_1$ and the negative input there is connected a feedback network comprising resistors $R_2$, $R_3$ and a capacitor C having the objects described hereinafter.

The output signal of the amplifier A1 on the line 210 is applied, through a line 212 and one of four input resistors R4, R5, R6, R7, to the negative input of a second operational amplifier A2, the positive input of which receives, through a line 214, a potential for compensation of the offset. The resistors R4, R5, R6, R7 are selected by means of the closing or opening of one or more of four electronic switches I4, I5, I6, I7 controlled by the signals present on the respective wires of the four-wire line 128, through which arrives the mechanical range signal G comprising a single digit in BCD code. The electronic switches I4, I5, I6, I7, like all the other electronic switches to which reference will be made hereinafter, may suitably be constituted by field effect transistors (FETs).

Further electronic switches I8, I9, I10, I11 can be closed or opened to select one or more of the direct connection L8 and three resistors R9, R10, R11 to be connected between the input and the output of the operational amplifier A2 as feedback elements. The four electronic switches I8, I9, I10, I11 are respectively controlled by the data present on the four wires 124-1 of a first group from among three groups of wires 124-1, 124-2, 124-3 of the twelve-wire line 124, which carries three digits $x^*_{n1}, x^*_{n2}, x^*_{n3}$ of the diameter instruction in parallel digital form. As in the case of the cutting rate instruction $S^*$, the first digit $x_{n1}$ of the diameter instruction also indicates in this case the order of magnitude or scale of the diameter.

The two significant digits $x^*_{n2}, x^*_{n3}$ parallel digital form control, through the two groups of wires 124-2, 124-3, eight electronic switches I12, I13, I14, I15 and I16, I17, I18, I19, resepectively, to select one or more input resistors from among the resistors R12, R13, R14, R15, R16, R17, R18, R19 of a third operational amplifier A3 provided with a single feed-back resistor R20 and an offset compensation line 216. The eight electronic switches I12, I13, I14, I15, I16, I17, I18, I19 are connected in parallel to an output line 123 of the amplifier A2.

The output signal of the amplifier A3 passes, through a line 218 and a resistor R21, to the same negative input of the operational amplifier A1 at which the signal $-S_A$ arrives.

From the description given of the circuits associated with the two amplifiers A2, A3, it can be seen how the input signal of this cascade of amplifiers, on the line 212, is multiplied in practice by the two amplifiers by a factor proportional to the ratio between the diameter $x_n$ and the mechanical range G. The whole loop comprising the three amplifiers A1, A2, A3 therefore supplies on the line 210 an output signal N which satisfies the equation $$S_A - x_n N = N/K, \text{ whence}$$

$$N \approx (S_A/kx_n)$$

with K = gain of A1, and therefore, with an approximation which is all the greater the greater the gain of the amplifier A1, corresponds to the analogue signal N with which it is desired to command the mandrel servomotor.

The object of the capacitor C in the feedback network of the amplifier A1 is to ensure that the gain of the chain A1, A2, A3 with associated circuit elements passes through the O dB axis at high frequencies with a slope of 20 dB/octave in order to ensure the stability of the feedback loop.

A preferred embodiment of an improved-type numerical system according to the invention has been described. It is obvious, however, that the principles of operation set forth can also be achieved with other forms of circuit and with data encoded in a different manner. In particular, it is possible, with suitable circuit modifications, to employ parallel digital data where the description refers to serial digital data, and vice versa. The same arbitrariness of choice applies in comparisons of analogue signals with respect to digital signals. The choices of the most suitable forms of the data or instructions will depend on considerations of design linked to cost, precision of technological operation and materials available, etc.

Moreover, it is possible to realize the main objects of the invention at least partially also by omitting some of the advantageous characteristics of the circuit embodiments hereinbefore described. In particular, for example, the manual correcting devices 74 and/or 72 of FIG. 2 may be omitted, where they are superfluous, without the basic advantages of the invention being lost. The same option of omission is also valid as regards the adjustment of the cutting rate (correcting device 132, FIG. 2). Finally, it is possible to omit command of the coefficient of proportionality in the dividing-converting circuit 126 (FIG. 2) by a mechanical range signal G in the case where a driving system with a fixed transmission ratio is used for the mandrel.

We claim:
1. Numerical control apparatus for controlling the machining of a workpiece rotated by a mandril of a lathe, the machining of said workpiece requiring the tool of the lathe to move along a multisegment path with respect to said workpiece, said apparatus comprising:
   means for reading from an input record medium the coordinates of the end point of the next segment of said path with respect to the axis of the workpiece, the datum specifying the programmed divergence of the transverse position of the cutting edge of a programmed tool being used with respect to the cutting edge of a reference tool, the cutting rate for said programmed tool, and the axial feed rate of said programmed tool;
   settable means for adjusting said datum according to the tool being used with respect to the programmed tool;
   means receptive of said coordinates and said adjusted datum from said reading means for generating artificial coordinates of said end point inclusive of said divergence of the cutting edge of the used tool;

means for interpolating the artificial coordinates of the beginning point and the artificial coordinates of the end point of said next segment and the axial feed rate of said tool to continually specify the proper instantaneous distance of the tool from said axis at all times during the machining of said next segment;

means receptive of said instantaneous distance information from said interpolating means and said divergence for generating the proper instantaneous transverse dimension of the portion of said workpiece being cut;

controllable means for driving the mandril of the lathe at a selected speed of rotation; and means for forming the ratio of the cutting rate to said instantaneous transverse dimension for generating an output proportional to said ratio to control the rotational speed at which said mandril drive means drives said mandril for effecting the optimum cutting rate as a function of the divergencne of the tool.

2. The apparatus of claim 1 wherein said mandril is driven by a motor through a speed changing transmission, further including:

means for generating a mechanical range signal of said transmission, said ratio forming means being coefficient of proportionality of its output to the ratio of said instantaneous transverse dimension and said cutting rate.

3. The apparatus of claim 1 wherein said ratio forming means further includes manually adjustable correcting means for adjusting the coefficient of proportionality between the output produced by said ratio forming means and said ratio.

4. The apparatus of claim 1 wherein said ratio forming means includes:

a digital to analogue converter for converting the cutting rate from a digital to an analogue signal;

a multiplier for forming the product of the output of the ratio forming means and the ratio between the instantaneous transverse dimension and the mechanical range signal; and a circuit for forming the difference between the converted cutting rate and the output of said multiplier for generating an output proportional to the ratio between the cutting rate and the instantaneous transverse dimension.

5. The apparatus according to claim 4 wherein said multiplier includes an analogue amplifier, said ratio forming means further including means controlled by the instantaneous transverse dimension and the mechanical range signal for controlling the gain of said amplifier.

* * * * *

UNITED STATES PATENT OFFICE
CERTIFICATE OF CORRECTION

PATENT NO. : 3,987,350

DATED : October 19, 1976

INVENTOR(S) : Piero Pomella and Luciano Lauro

It is certified that error appears in the above-identified patent and that said Letters Patent are hereby corrected as shown below:

On the first page after

"[21] appln. no. 477,137 insert

--[30] Foreign Application Priority Data

May 18, 1971        Italy . . . . . .68650-A/71--.

Signed and Sealed this

Twenty-first Day of June 1977

[SEAL]

Attest:

RUTH C. MASON
*Attesting Officer*

C. MARSHALL DANN
*Commissioner of Patents and Trademarks*